United States Patent
Park et al.

(10) Patent No.: US 12,307,634 B2
(45) Date of Patent: May 20, 2025

(54) DISPLAY DEVICE

(71) Applicant: LG ELECTRONICS INC., Seoul (KR)

(72) Inventors: Jongho Park, Seoul (KR); Heekyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 497 days.

(21) Appl. No.: 17/658,583

(22) Filed: Apr. 8, 2022

(65) Prior Publication Data
US 2023/0107150 A1    Apr. 6, 2023

(30) Foreign Application Priority Data
Oct. 1, 2021 (KR) .................. 10-2021-0131128

(51) Int. Cl.
*G06V 10/44* (2022.01)
*G06T 5/70* (2024.01)
*G06T 7/20* (2017.01)

(52) U.S. Cl.
CPC .............. *G06T 5/70* (2024.01); *G06T 7/20* (2013.01); *G06V 10/44* (2022.01)

(58) Field of Classification Search
CPC .... G06T 5/70; G06T 7/20; G06T 5/73; G06T 2207/10016; G06T 2207/20182; G06T 2207/20201; G06T 5/50; G06T 7/13; G06V 10/44; G06V 40/162; G06V 40/167; H04N 5/21; H04N 5/144
See application file for complete search history.

(56) References Cited

U.S. PATENT DOCUMENTS

| | | | |
|---|---|---|---|
| 2004/0080517 A1 | 4/2004 | Song et al. | |
| 2006/0098743 A1* | 5/2006 | Nakajima | H04N 19/159 348/E7.003 |
| 2010/0141674 A1* | 6/2010 | Ohara | G09G 3/2059 345/589 |
| 2010/0277647 A1* | 11/2010 | Tanigawa | H04N 5/21 382/270 |
| 2011/0273449 A1* | 11/2011 | Kiuchi | G09G 3/2022 345/589 |
| 2021/0233218 A1* | 7/2021 | Osawa | G06T 5/92 |
| 2023/0076845 A1* | 3/2023 | Takatori | H04N 19/122 |

FOREIGN PATENT DOCUMENTS

| | | | | |
|---|---|---|---|---|
| KR | 2003001770 A | * | 1/2003 | |
| KR | 1020040029687 | | 4/2004 | |
| KR | 2004078427 A | * | 9/2004 | ........ G09G 3/2022 |
| KR | 20040078427 | | 9/2004 | |

OTHER PUBLICATIONS

PCT International Application No. PCT/KR2022/004842, International Search Report dated Jul. 8, 2022, 5 pages.

* cited by examiner

*Primary Examiner* — Tom Y Lu
*Assistant Examiner* — Andrew B. Jones
(74) *Attorney, Agent, or Firm* — LEE, HONG, DEGERMAN, KANG & WAIMEY

(57) ABSTRACT

A display device includes a display configured to output image data, and a controller configured to extract a contour noise removal region from the image data, acquire motion information of the image data, and remove contour noise based on a de-contour gain value corresponding to the motion information.

12 Claims, 13 Drawing Sheets

Vertical

Horizontal

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2021-0131128, filed on Oct. 1, 2021, the contents of which are all hereby incorporated by reference herein in its entirety.

BACKGROUND

The present disclosure relates to a display device that provides a de-contour method for removing image contour.

A display device is a device having a function of receiving, processing, and displaying an image that can be viewed by a user. A display device receives, for example, a broadcast signal selected by a user among broadcast signals transmitted from a broadcast station, separates an image signal from the received broadcast signal, and displays the separated image signal on a display.

On the other hand, when an image is output using a display device, contour noise is generally generated.

Contour noise, also called pseudo-contour noise, refers to a deterioration phenomenon in which noise in the form of a contour is observed in a portion with uniform brightness without an actual contour in an original image.

Such contour noise is noise generated in a quantization process, an image compression and restoration process, and image processing process for image quality improvement, which are performed when acquiring an image, and may be mainly seen in a flat region.

A current display device removes contour noise with a consistent strength (using a static curve, etc.) in order to remove contour noise from an image. In this case, since contour noise is removed without considering detail information and motion information of the image, side effects such as image breaking or halo around objects occur in images with fast motion.

SUMMARY

The present disclosure aims to remove contour noise by using motion information and detail information of an image.

A display device according to an embodiment of the present disclosure includes a display configured to output image data, and a controller configured to extract a contour noise removal region from the image data, acquire motion information of the image data, and remove contour noise based on a de-contour gain value corresponding to the motion information.

In addition, the controller may be configured to remove the contour noise based on a de-contour gain table to which the de-contour gain value corresponding to the motion information is mapped.

In addition, the de-contour gain table may include at least one or more coordinates mapped so that, as the motion information has a larger value, the de-contour gain value is smaller.

The de-contour gain table may include a plurality of mapping coordinates, first coordinates among the plurality of mapping coordinates may have a first de-contour gain value corresponding to a first motion information value, second coordinates among the plurality of mapping coordinates may have a second de-contour gain value corresponding to a second motion information value, and when the first motion information value is greater than the second motion information value, the first de-contour gain value may be smaller than the second de-contour gain value.

In addition, the de-contour gain table may include a table including a plurality of coordinates having the de-contour gain value corresponding to the motion information by connecting the first coordinates to the second coordinates.

In addition, the controller may be configured to: detect at least one of a detail region, a skin region, or a high luminance generation region from the image data; generate blur data by blurring regions other than the detected region from the image data; synthesize the blur data and the image data; and perform contour noise removal based on the de-contour gain table.

The controller may be configured to output, on the display, a screen showing that dynamic contour noise removal is performed based on the motion information.

An operating method of a display device according to an embodiment of the present disclosure includes outputting image data on a display, extracting a contour noise removal region from the image data, and acquiring motion information of the image data and removing contour noise based on a de-contour gain value corresponding to the motion information.

In addition, the removing of the contour noise based on the de-contour gain value may include removing the contour noise based on a de-contour gain table to which the de-contour gain value corresponding to the motion information is mapped.

In addition, the de-contour gain table may include at least one or more coordinates mapped so that, as the motion information has a larger value, the de-contour gain value is smaller.

In addition, the de-contour gain table may include a plurality of mapping coordinates, first coordinates among the plurality of mapping coordinates may have a first de-contour gain value corresponding to a first motion information value, second coordinates among the plurality of mapping coordinates may have a second de-contour gain value corresponding to a second motion information value, and when the first motion information value is greater than the second motion information value, the first de-contour gain value may be smaller than the second de-contour gain value.

In addition, the de-contour gain table may include a table including a plurality of coordinates having the de-contour gain value corresponding to the motion information by connecting the first coordinates to the second coordinates.

In addition, the extracting of the contour noise removal region from the image data may include detecting at least one of a detail region, a skin region, or a high luminance generation region from the image data, generating blur data by blurring regions other than the detected region from the image data, and synthesizing the blur data and the image data.

In addition, the operating method may further include outputting, on a display, a screen showing that dynamic contour noise removal is performed based on the motion information.

DETAILED DESCRIPTION OF THE EMBODIMENTS

Hereinafter, embodiments relating to the present disclosure will be described in detail with reference to the accompanying drawings. The suffixes "module" and "-er/or" for components used in the description below are assigned or mixed in consideration of easiness in writing the specification and do not have distinctive meanings or roles by themselves.

Figure 1:
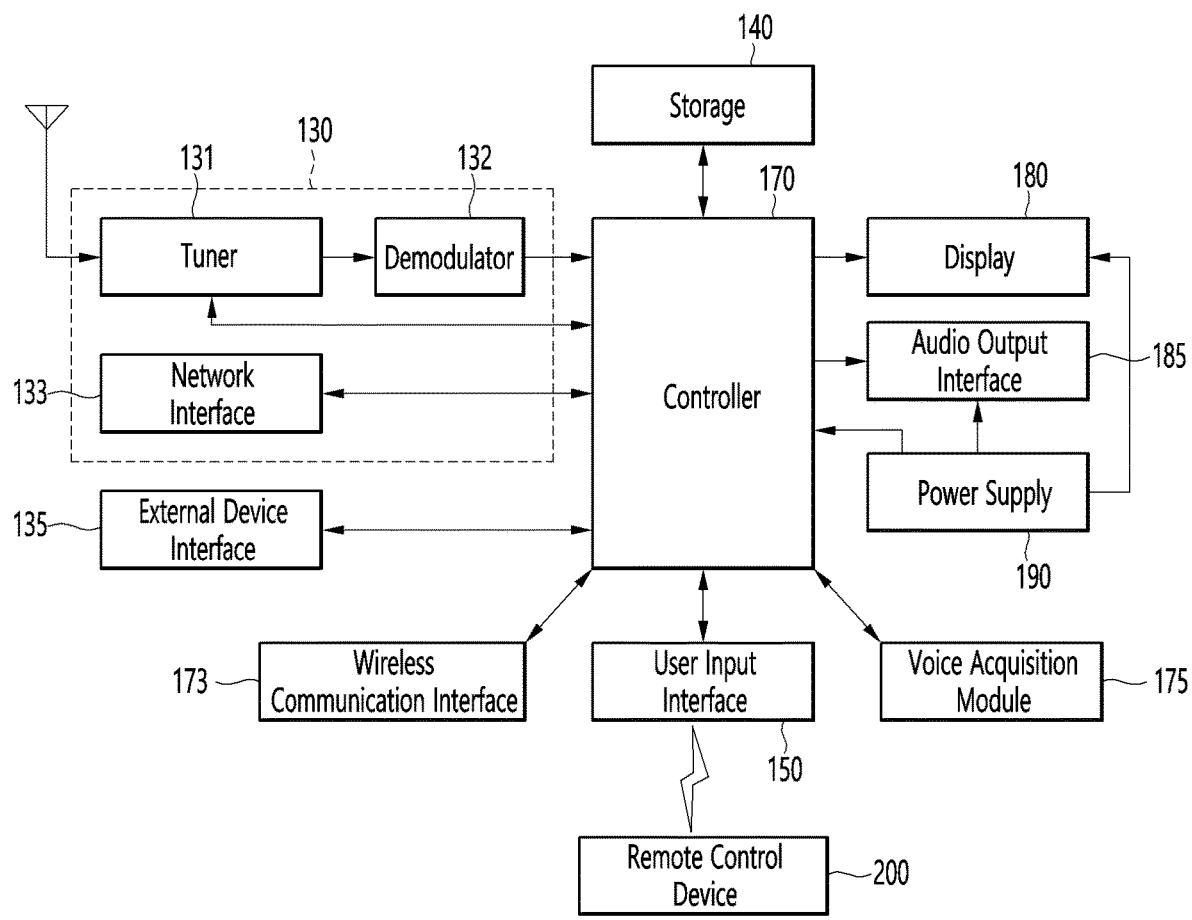
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a storage 140, a user input interface 150, a controller 170, a wireless communication module 173, a voice acquirer 175, a display 180, an audio output interface 185, and a power supply 190.

The broadcast receiver 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into the form capable of being output.

The network interface 133 may provide an interface for connecting the display device 100 to a wired/wireless network including an Internet network. The network interface 133 may transmit or receive data to or from another user or another electronic device through an accessed network or another network linked to the accessed network.

The network interface 133 may access a predetermined webpage through an accessed network or another network linked to the accessed network. That is, the network interface 133 may transmit or receive data to or from a corresponding server by accessing a predetermined webpage through the network.

The network interface 133 may receive content or data provided from a content provider or a network operator. That is, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the air, through the network.

The external device interface 135 may receive an application or an application list in an adjacent external device, and may transmit the application or the application list to the controller 170 or the storage 140.

The external device interface 135 may provide a connection path between the display device 100 and the external device. The external device interface 135 may receive at least one an image or audio output from the external device that is wirelessly or wiredly connected to the display device 100, and may transmit the image and/or the audio to the controller 170. The external device interface 135 may include a plurality of external input terminals. The plurality of external input terminals may include an RGB terminal, at least one High Definition Multimedia Interface (HDMI) terminal, and a component terminal.

An image signal of the external device input through the external device interface 135 may be output through the display 180. A voice signal of the external device input through the external device interface 135 may be output through the audio output interface 185.

The external device connectable to the external device interface 135 may be one of a set-top box, a Blu-ray player, a DVD player, a game console, a sound bar, a smartphone, a PC, a USB memory, and a home theater system, but this is only an example.

In addition, some content data stored in the display device 100 may be transmitted to a user or an electronic device, which is selected from other users or other electronic devices preregistered in the display device 100.

The storage 140 may store programs for signal processing and control in the controller 170, and may store signal-processed image, voice, or data signals.

In addition, the storage 140 may perform a function for temporarily storing image, voice, or data signals output from the external device interface 135 or the network interface 133, and may store information on a predetermined image through a channel memory function.

The storage 140 may store an application or an application list input from the external device interface 135 or the network interface 133.

The display device 100 may play content files (e.g., video files, still image files, music files, document files, application files, etc.) stored in the storage 140, and may provide the content files to a user.

The user input interface 150 may transmit signals input by a user to the controller 170, or may transmit signals from the controller 170 to a user. For example, the user input interface 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input interface 150 may transmit, to the controller 170, control signals input from local keys (not shown) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the audio output interface 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input interface 150, and may access the network to download a desired application or application list into the display device 100.

The controller 170 may output channel information selected by a user together with the processed image or voice signals through the display 180 or the audio output interface 185.

In addition, the controller 170 may output image signals or voice signals of an external device such as a camera or a camcorder, which are input through the external device interface 135, through the display 180 or the audio output interface 185, according to an external device image playback command received through the user input interface 150.

Moreover, the controller 170 may control the display 180 to display images, and may control the display 180 to display broadcast images input through the tuner 131, external input images input through the external device interface 135, images input through the network interface, or images stored in the storage 140. In this case, an image displayed on the display 180 may be a still image or video and also may be a 2D image or a 3D image.

In addition, the controller 170 may play content stored in the display device 100, received broadcast content, and external input content input from the outside, and the content may be in various formats such as broadcast images, external input images, audio files, still images, accessed web screens, and document files.

Moreover, the wireless communication module 173 may perform wired or wireless communication with an external device. The wireless communication module 173 may perform short-range communication with an external device. To this end, the wireless communication module 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies. The wireless communication module 173 can support wireless communication between the display device 100 and a wireless communication system, between the display device 100 and another display device 100, or between networks including the display device 100 and another display device 100 (or an external server) through wireless area networks. The wireless area networks may be wireless personal area networks.

The other display device 100 may be a mobile terminal such as a wearable device (e.g., a smart watch, a smart glass, a head mounted display (HMD), a smartphone, etc.), which is capable of exchanging data (or interworking) with the display device 100. The wireless communication module 173 may detect (or recognize) a wearable device capable of communication around the display device 100. Furthermore, if the detected wearable device is a device authenticated to communicate with the display device 100, the controller 170 may transmit at least part of data processed by the display device 100 to the wearable device through the wireless communication module 173. Therefore, a user of the wearable device may use the data processed by the display device 100 through the wearable device.

The voice acquirer 175 may acquire audio. The voice acquirer 175 may include at least one microphone (not shown), and may acquire audio around the display device 100 through the microphone (not shown).

The display 180 may convert image signals, data signals, or on-screen display (OSD) signals, which are processed by the controller 170, or images signals or data signals, which are received by the external device interface 135, into R, G, and B signals to generate driving signals.

Furthermore, the display device 100 shown in FIG. 1 is only one embodiment of the present disclosure, and thus some components shown in FIG. 1 may be integrated, added, or omitted according to the specification of the display device 100 to be actually implemented.

That is, if necessary, two or more components may be integrated into one component, or one component may be divided into two or more components. In addition, the functions performed by each block are provided for describing an embodiment of the present disclosure and its specific operations or devices do not limit the scope of the present disclosure.

According to another embodiment of the present disclosure, unlike FIG. 1, the display device 100 may receive images through the network interface 133 or the external device interface 135 and play the received images without including the tuner 131 and the demodulator 132.

For example, the display device 100 may be divided into an image processing device such as a set-top box for receiving broadcast signals or content according to various network services and a content playback device for playing content input from image processing device.

In this case, an operating method of a display device according to an embodiment of the present disclosure may be performed by one of the display device described with reference to FIG. 1, the image processing device such as the separated set-top box, and the content playback device including the display 180 and the audio output interface 185.

The audio output interface 185 receives signals voice-processed by the controller 170 and outputs the signals as voice.

The power supply 190 supplies power to the entire display device 100. In particular, the power supply 190 may supply power to the controller 170 that can be implemented in the form of a system on chip (SOC), the display 180 for image display, the audio output interface 185 for audio output, and the like.

Specifically, the power supply 190 may include a converter that converts AC power into DC power, and a DC/DC converter that converts the level of DC power.

A remote control device according to an embodiment of the present disclosure will be described with reference to FIGS. 2 and 3.

Figure 2:
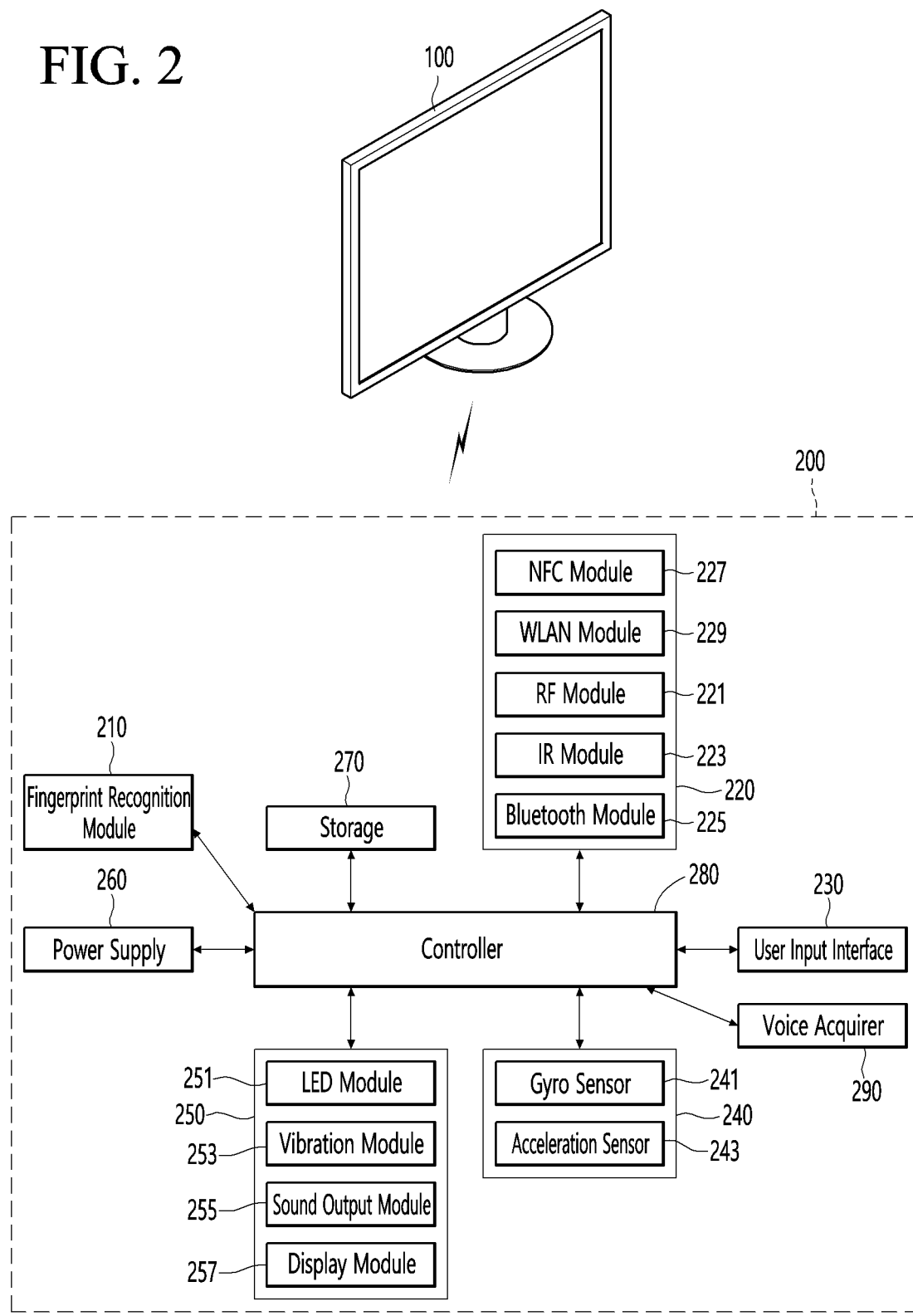
FIG. 2 is a block diagram illustrating a remote control device according to an embodiment of the present disclosure.
Figure 3:
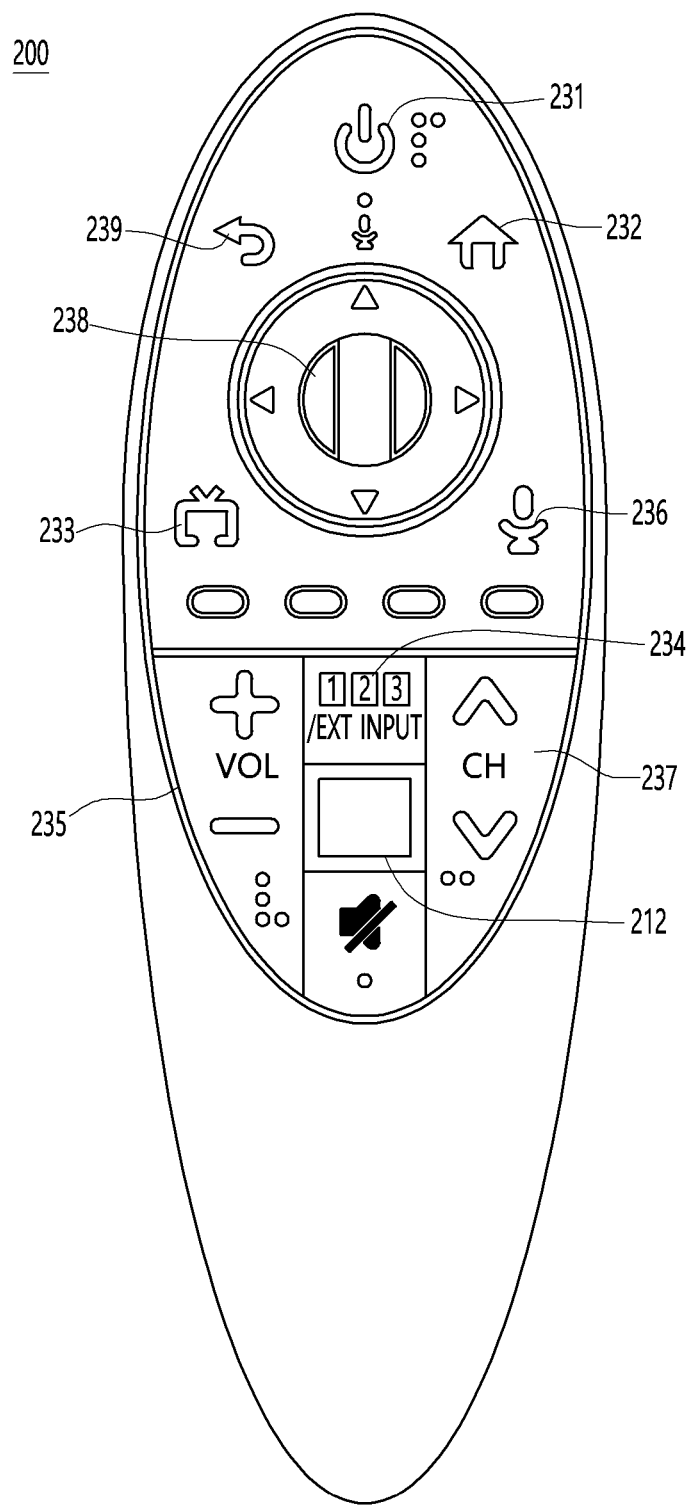
FIG. 3 is a diagram illustrating an actual configuration of a remote control device according to an embodiment of the present disclosure.

FIG. 2 is a block diagram illustrating a remote control device according to an embodiment of the present disclosure, and FIG. 3 is a diagram illustrating an actual configuration of a remote control device according to an embodiment of the present disclosure.

First, referring to FIG. 2, a remote control device 200 may include a fingerprint recognizer 210, a wireless communication module 220, a user input interface 230, a sensor module 240, an output interface 250, a power supply 260, a storage 270, a controller 280, and a voice acquirer 290.

Referring to FIG. 2, the wireless communication module 220 transmits or receives signals to or from an arbitrary one of the display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication module 220.

Moreover, the remote control device 200 may receive signals transmitted from the display device 100 through the RF module 221 and if necessary, may transmit a command for power on/off, channel change, and volume change to the display device 100 through the IR module 223.

The user input interface 230 may be configured with a keypad, a button, a touch pad, or a touch screen. A user may operate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 can include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input interface 230 includes a touch screen, a user may touch a soft key of the touch screen to input a command relating to the display device 100 to the remote control device 200. In addition, the user input interface 230 may include various kinds of input interfaces operable by a user, for example, a scroll key and a jog key, and this embodiment does not limit the scope of the present disclosure.

The sensor module 240 may include a gyro sensor 241 or an acceleration sensor 243. The gyro sensor 241 may sense information on the movement of the remote control device 200.

For example, the gyro sensor 241 may sense information on the operation of the remote control device 200 on the basis of x, y, and z axes, and the acceleration sensor 243 may sense information on the moving speed of the remote control device 200. Moreover, the remote control device 200 may further include a distance measurement sensor that senses a distance with respect to the display 180 of the display device 100.

The output interface 250 may output image or voice signals in response to the operation of the user input interface 230, or may output image or voice signals corresponding to signals transmitted from the display device 100. A user may recognize whether the user input interface 230 is operated or the display device 100 is controlled through the output interface 250.

For example, the output interface 250 may include an LED module 251 for flashing, a vibration module 253 for generating vibration, a sound output module 255 for outputting sound, or a display module 257 for outputting an image, if the user input interface 230 is operated or signals are transmitted or received to or from the display device 100 through the wireless communication interface 220.

In addition, the power supply 260 supplies power to the remote control device 200. If the remote control device 200 does not move for a predetermined time, the power supply 260 stops supplying power so as to reduce power waste. The power supply 260 may resume the supply of power if a predetermined key provided at the remote control device 200 is operated.

The storage 270 may store various kinds of programs and application data required to control or operate the remote control device 200. If the remote control device 200 transmits or receives signals wirelessly through the display device 100 and the RF module 221, the remote control device 200 and the display device 100 transmit or receive signals through a predetermined frequency band.

The controller 280 of the remote control device 200 may store, in the storage 270, information on a frequency band for transmitting or receiving signals to or from the display device 100 paired with the remote control device 200, and may refer to the stored information.

The controller 280 controls general matters relating to the control of the remote control device 200. The controller 280 may transmit a signal corresponding to a predetermined key operation of the user input interface 230 or a signal corresponding to the movement of the remote control device 200 sensed by the sensor module 240 to the display device 100 through the wireless communication module 220.

In addition, the voice acquirer 290 of the remote control device 200 may acquire voice.

The voice acquirer 290 may include at least one microphone and acquire voice through the microphone.

Figure 4:
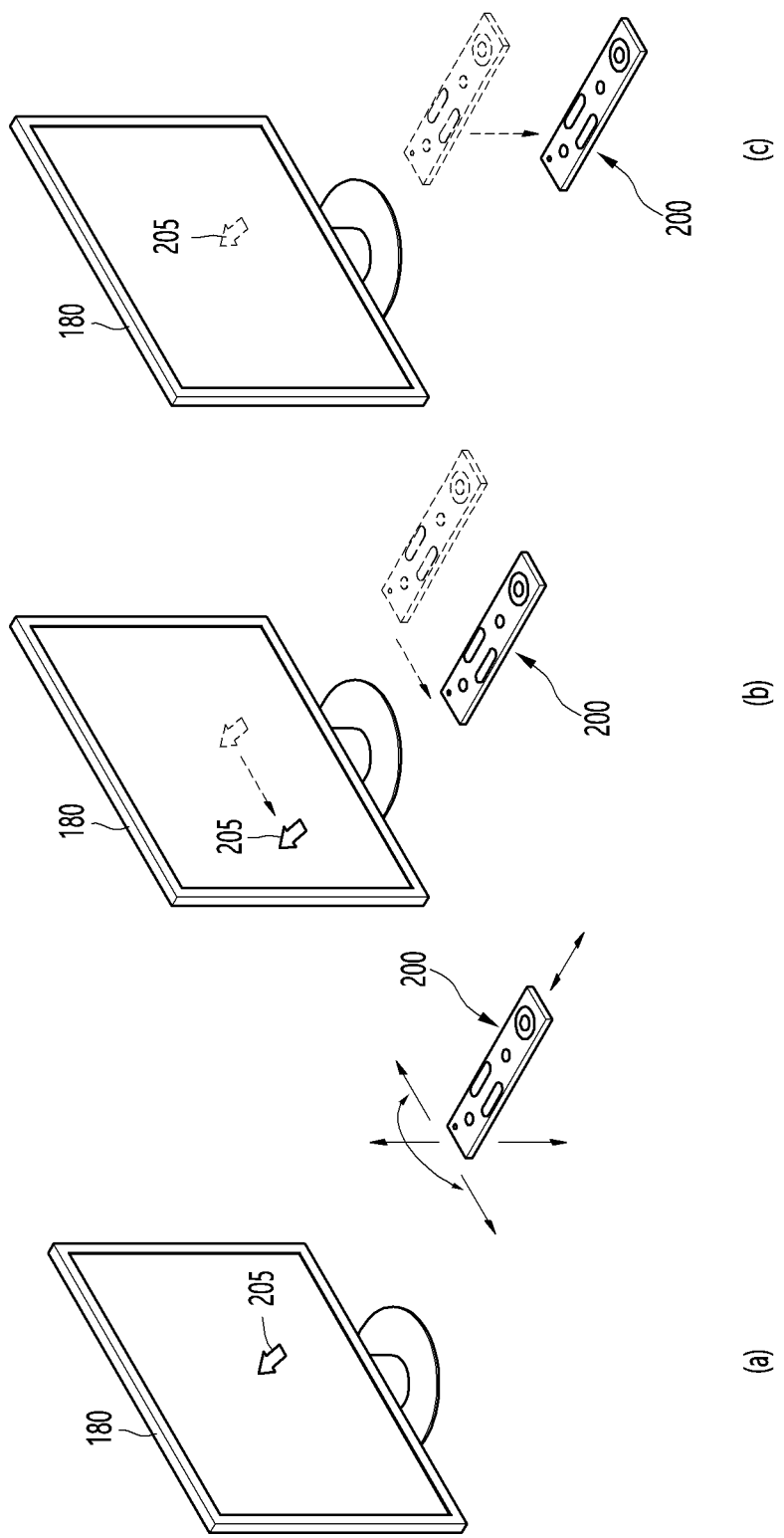
FIG. 4 is a diagram illustrating an example of utilizing a remote control device according to an embodiment of the present disclosure.

Next, FIG. 4 is described.

FIG. 4 is a diagram illustrating an example of utilizing the remote control device according to an embodiment of the present disclosure.

(a) of FIG. 4 illustrates that a pointer 205 corresponding to the remote control device 200 is displayed on the display 180.

A user may move or rotate the remote control device 200 vertically or horizontally. The pointer 205 displayed on the display 180 of the display device 100 corresponds to the movement of the remote control device 200. Since the corresponding pointer 205 is moved and displayed according to a movement on a 3D space as shown in the drawing, the remote control device 200 may be referred to as a spatial remote control device.

(b) of FIG. 4 illustrates that if a user moves the remote control device 200 to the left, the pointer 205 displayed on the display 180 of the display device 100 is moved to the left according to the movement of the remote control device 200.

Information on the movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

(c) of FIG. 4 illustrates that while a specific button in the remote control device 200 is pressed, a user moves the remote control device 200 so as to be away from the display 180. Thus, a selected region in the display 180 corresponding to the pointer 205 may be zoomed in and displayed in an enlarged size.

On the other hand, if a user moves the remote control device 200 so as to be closer to the display 180, a selected region in the display 180 corresponding to the pointer 205 may be zoomed out and displayed in a reduced size.

On the other hand, if the remote control device 200 is moved away from the display 180, a selected region may be zoomed out, and if the remote control device 200 is moved closer to the display 180, a selected region may be zoomed in.

In addition, if a specific button in the remote control device 200 is pressed, recognition of a vertical or horizontal movement may be excluded. That is, if the remote control device 200 is moved away from or closer to the display 180, the horizontal or vertical movement may not be recognized and only the back and forth movement may be recognized. While a specific button in the remote control device 200 is not pressed, only the pointer 205 is moved according to the horizontal or vertical movement of the remote control device 200.

Moreover, the moving speed or moving direction of the pointer 205 may correspond to the moving speed or moving direction of the remote control device 200.

Furthermore, the pointer as used herein refers to an object displayed on the display 180 in response to the operation of the remote control device 200. Therefore, in addition to the arrow form displayed as the pointer 205 in the drawing, various forms of objects are possible. For example, the above concept includes a point, a cursor, a prompt, and a thick outline. The pointer 205 may be displayed in correspondence to one point of a horizontal axis and a vertical axis on the display 180 and may also be displayed in correspondence to a plurality of points such as a line and a surface.

Figure 5:
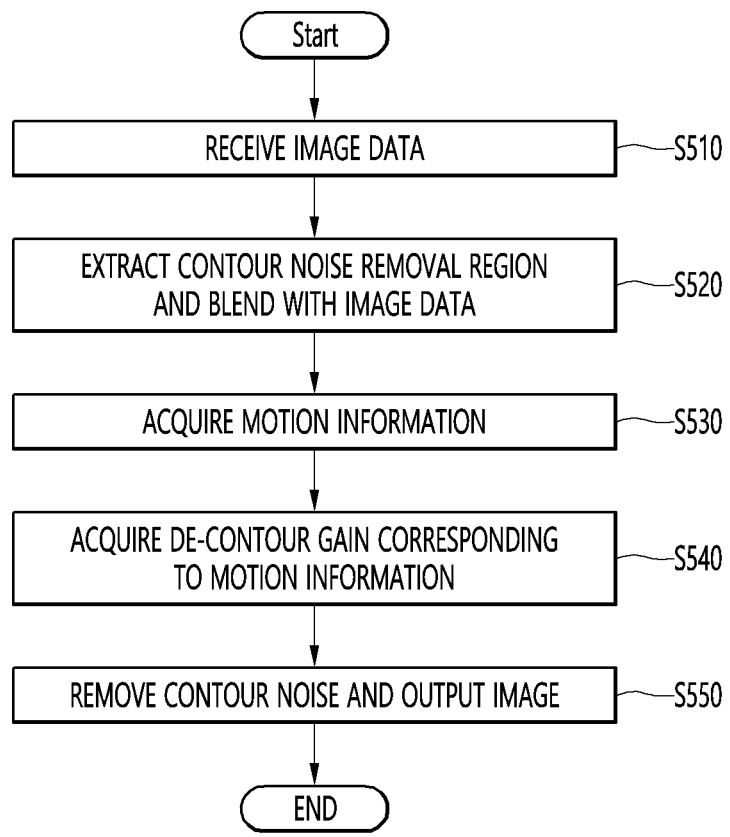
FIG. 5 is a flowchart according to an embodiment of the present disclosure.

FIG. 5 is a flowchart of a method for removing contour noise according to an embodiment of the present disclosure.

Prior to the description of the present disclosure, contour noise removal may be used interchangeably with "de-contour".

First, contour noise causes loss of image information due to image compression.

As the method for removing contour noise, a blurred image is generated by inserting a blurred image of an original image into the original image.

That is, the contour noise may be removed by synthesizing and blending the original image and the blurring image.

Specifically, if the blurred image of the original image is generated and MAD{the sum of abs(input−Blur/block average) in one block) is large compared with pixels of the original image, the detail of the image is protected by reducing a gain indicating a de-contour degree, and if MAD {the sum of abs(input−Blur/block average) in one block) is small, a de-contour degree is strengthened to remove contour noise.

However, in the conventional method for removing contour noise, a predetermined value that does not consider motion characteristics of the received image is used.

For example, if image data output by the display device is not de-contoured, or if the gain value indicating the de-contour degree is performed up to 100, contour noise was removed by using the gain value of 10, which is a constant value for all image data output by the display device.

In addition, depending on the types of the released display devices, the gain value has been set to a constant value, for example, off (e.g., 0), low (e.g., 30), mid (removed by an intermediate step, e.g., 60), and high (strongly removed, e.g., 90).

On the other hand, when viewing an image, a general consumer mainly views an image including a large number of movements and details. Therefore, if a high de-contour gain is applied, image sharpness is deteriorated. For example, the image is blurred and output, or artifacts occur at a boundary of an object included in the image.

The display device 100 according to an embodiment of the present disclosure may maximally preserve detail information of the image by applying a dynamic de-contour gain in addition to motion information of the image.

Referring to FIG. 5, the controller 170 according to an embodiment of the present disclosure may receive image data to be output (S510). The controller 170 may recognize that contour noise has occurred through preprocessing and processing of image data to be output.

The controller 170 may extract a contour noise removal region in order to remove the contour noise, and may blend blurred image of the extracted contour noise removal region with the image data (S520).

In this case, the contour noise removal region may refer to a region excluding a detail region, a skin region, and a high luminance generation region from the image data.

Specifically, the controller 170 may detect at least one of the detail region, the skin region, or the high luminance generation region from the image data.

In this case, the detail region may refer to a region in which feature data relating to the boundary and the object included in the image are displayed. In addition, the skin region may refer to a region including a skin and a face of a person output on the image.

In addition, the high luminance generation region may refer to a region in which a change in light density in a specific direction, i.e., the amount of light passing through a specific region and entering at a specific solid angle, is equal to or greater than a specific value.

The controller 170 according to an embodiment of the present disclosure may detect the detail region, the skin region, and the high luminance generation region by using a corresponding region detection model. This will be described in detail with reference to FIG. 6.

Figure 6:
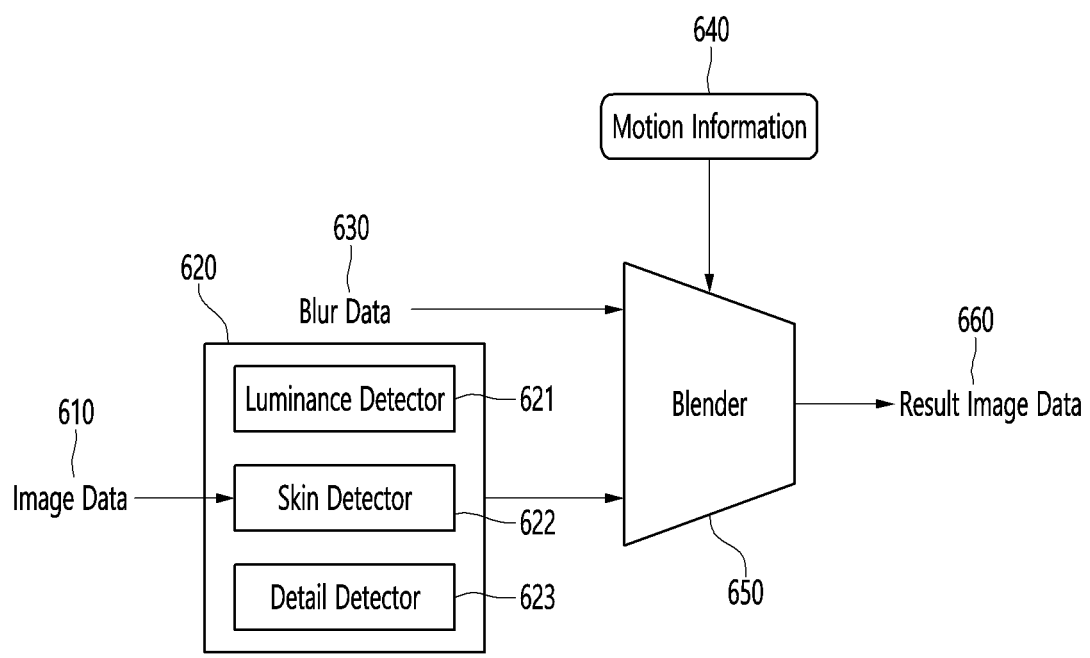
FIG. 6 is a block diagram according to an embodiment of the present disclosure.

FIG. 6 is a block diagram illustrating a method for removing contour noise according to an embodiment of the present disclosure.

Referring to FIG. 6, the controller 170 may receive image data 610. The received image data may be input to an exception processing region detector 620.

The exception processing region detector 620 according to an embodiment of the present disclosure may include a luminance detector 621 that detects a high luminance generation region, a skin detector 622 that detects a skin, and a detail detector 623 that detects a detail region of an image.

The controller 170 may detect a high luminance region, a skin region, and a region with a lot of detail components by passing the image data 610 through the luminance detector 621, the skin detector 622, and the detail detector 623.

Furthermore, the detail detector 623 may divide the image data 610 into a flat region, a detail region, and a contour region according to a detail degree. The detail detector 623 may determine a detail degree based on a difference between a pixel value of a predetermined pixel and a pixel value of an adjacent pixel. For example, as a difference between a pixel value of a predetermined pixel and a pixel value of an adjacent pixel increases, the image data 610 may be divided in the order of the flat region, the contour region, and the detail region. The detail region may be a region having a lot of detail components.

Figure 11:
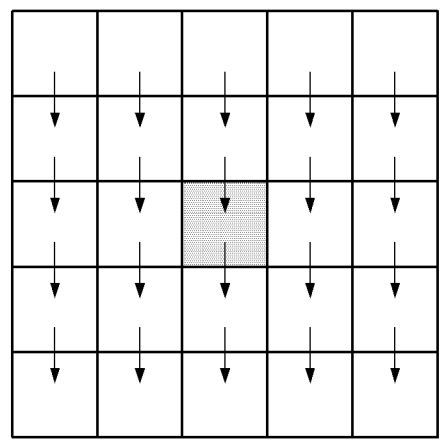
FIG. 11 is a diagram for explaining a method for acquiring a detail degree according to an embodiment of the present disclosure.
Figure 11:
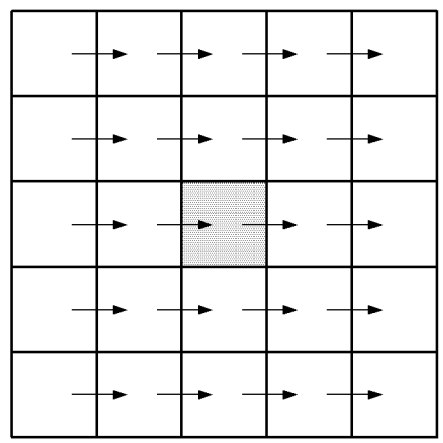

FIG. 11 is a diagram for explaining a method for acquiring a detail degree according to an embodiment of the present disclosure.

Referring to FIG. 11, when the detail detector 623 acquires the detail degree by calculating the difference between the pixel value of each pixel and each adjacent pixel value, the detail detector 623 may acquire the detail degree by calculating the difference from the adjacent pixel value in a vertical method or a horizontal method.

Furthermore, the detail detector 623 may acquire the detail degree for each spatial mask having a predetermined block size with respect to the image data 610, and may divide the region for each spatial mask into a flat region, a contour region, and a detail region.

Figure 12:
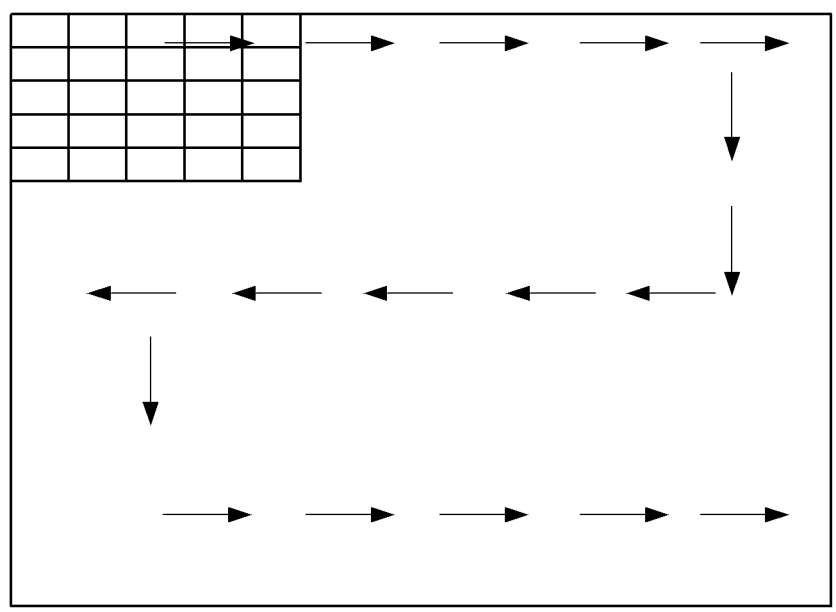
FIG. 12 is a diagram for explaining a method for acquiring a detail degree for each spatial mask according to an embodiment of the present disclosure.

FIG. 12 is a diagram for explaining a method for acquiring a detail degree for each spatial mask according to an embodiment of the present disclosure.

Referring to FIG. 12, the detail detector 623 may shift the detail degree for each space mask of a predetermined pixel unit (e.g., 5*5) by moving the position of the space mask in a predetermined manner. For example, the detail detector 623 may acquire a detail degree of a corresponding spatial mask region by calculating a difference by comparing each pixel in the spatial mask with an adjacent pixel to and classify the regions, and may divide the region. The block size of the spatial mask may be changed, and when the image data is 4K, the block size may have a pixel unit of 40*40.

In addition, the detail detector 623 may generate a blurred image corresponding to the image data for each spatial mask. The blurred image may be an average value of pixels in one spatial mask. The detail detector 623 may determine the detail of the image by calculating a difference between an original image of the image data corresponding to the spatial mask and a blurred image that is an average value of pixels in one spatial mask.

For example, the detail detector 623 may calculate a mean absolute deviation (MAD) for each spatial mask.

Figure 13:
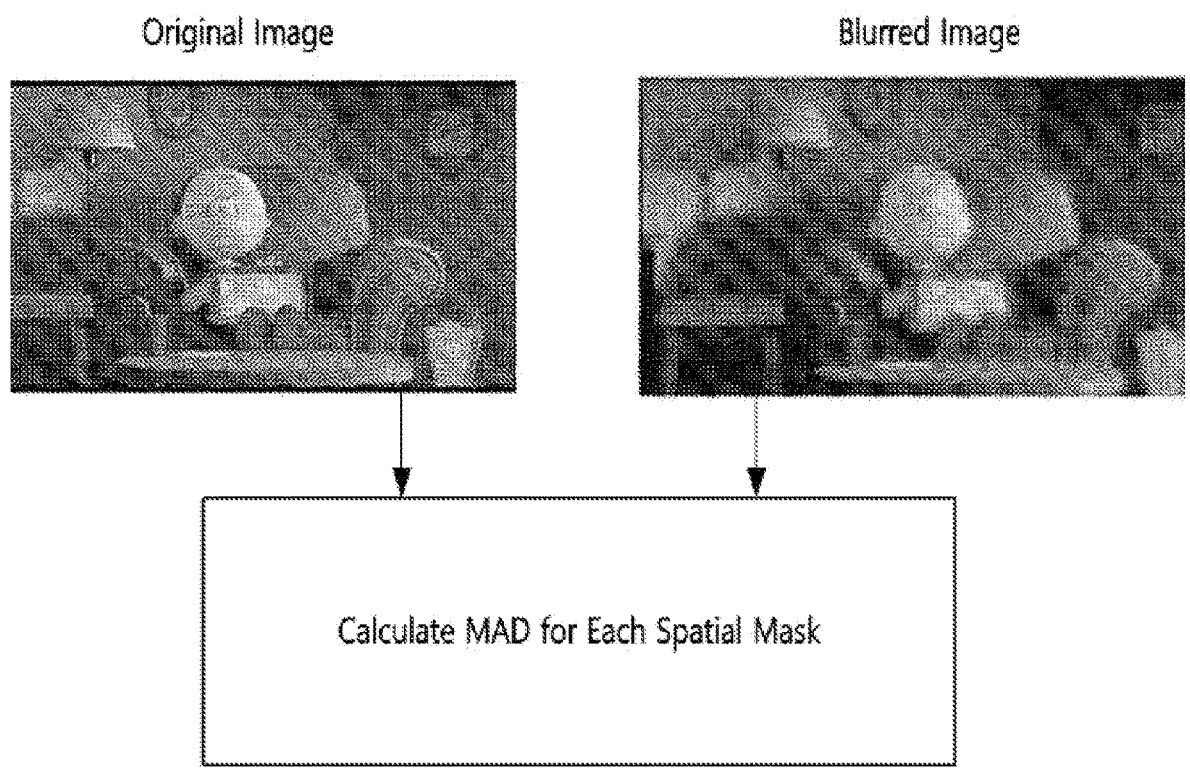
FIG. 13 is a diagram for explaining a method for acquiring MAD for each spatial mask according to an embodiment of the present disclosure.

FIG. 13 is a diagram for explaining a method for acquiring the MAD for each spatial mask according to an embodiment of the present disclosure.

Referring to FIG. 13, the detail detector 623 may acquire the MAD by comparing the original image of the spatial mask with the blurred image of the spatial mask. The MAD may be the sum of the differences between the pixel average value of the original image and the pixel average value of the blurred image.

When the MAD value for each spatial mask is equal to or greater than a predetermined value, the detail detector 623 may determine the region as the detail region having a lot of detail components. In addition, when the MAD value is smaller than the predetermined value, the detail detector 623 may determine the region as the flat region or the contour region.

The controller 170 may protect the texture of the image by lowering the strength of the de-contour gain for the detail region in which the MAD value is equal to or greater than the predetermined value.

The controller 170 may remove the contour of the image by increasing the strength of the de-contour gain for the detail region in which the MAD value is smaller than the predetermined value.

The detail detector 623 may detect the skin region based on color information of the image data. For example, the detail detector 623 may determine, as the skin region, the region in which the color corresponding to the skin color range is detected in the image data.

The controller 170 may preserve facial expression by reducing the strength of the de-contour gain in the region determined as the skin region.

The controller 170 according to an embodiment of the present disclosure may set an exception region by merging at least one or more regions detected by the exception processing region detector 620, and may generate blur data 630 by blurring regions other than the detected exception region from the image data.

This will be described in detail with reference to FIG. 7.

Figure 7:
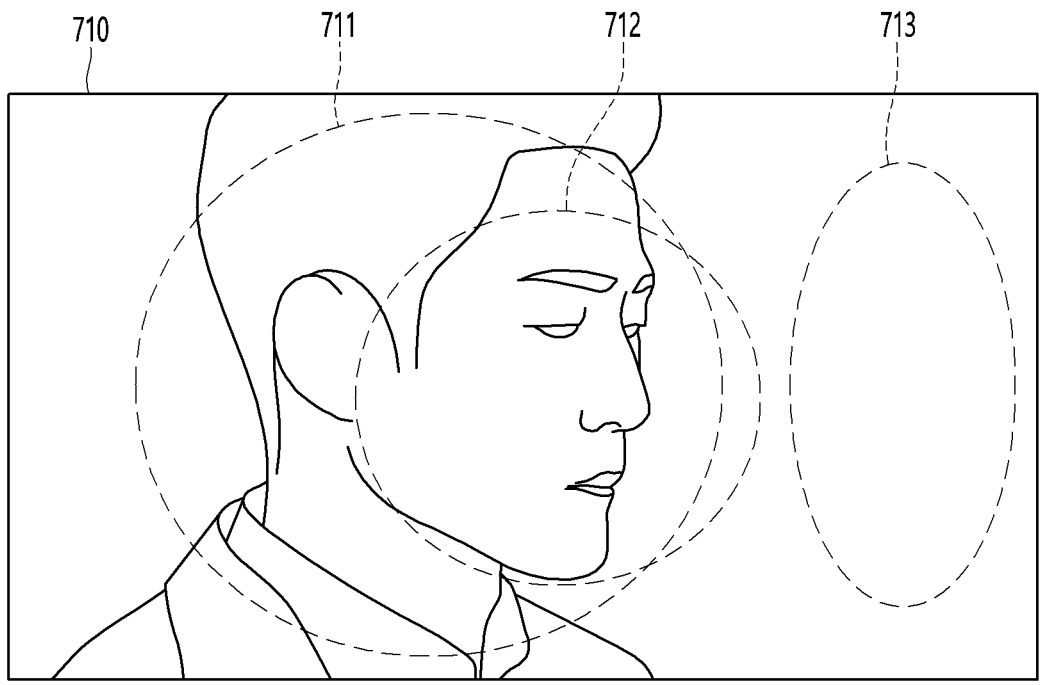
FIG. 7 illustrates detection of an exception region according to an embodiment of the present disclosure.

FIG. 7 is a diagram illustrating an example of extracting at least one region by the region detector according to an embodiment of the present disclosure.

Referring to FIG. 7, the controller 170 may input image data 710 to the exception processing region detector 620.

The exception processing region detector 620 may detect a skin region 712 extracted from the image data 710 by the skin detector 622, and a detail region 711 detected from the image data 710 by the detail detector 623.

The controller may generate an exception region by merging the skin region 712 and the detail region 711.

The controller 170 according to an embodiment of the present disclosure may generate blur data by blurring regions (e.g., 713) other than the exception regions 711 and 712 in the image data 710.

The blur data may be alpha-blended with the original image data 710 through a blender 650.

The controller 170 according to an embodiment of the present disclosure may generate image data to be used in a contour noise removal algorithm through the alpha blending.

FIG. 6 is described again. The controller 170 may blend the blur data 630 and the image data 610 in the blender 650. In this case, the blending may refer to inserting a pixel corresponding to the blur data into the image data 610 or alpha blending.

After that, the controller 170 may acquire motion information included in the image data, may acquire a de-contour gain based on a de-contour gain table corresponding to the motion information, and may generate resulting image data 660 by removing contour noise based on the strength of the de-contour gain.

FIG. 5 is described again.

According to an embodiment of the present disclosure, after extracting the contour noise removal region, the controller 170 may acquire motion information included in the image data (S530).

In this case, the motion information may refer to a value expressed by quantifying a motion degree included in the image data. In the present disclosure, it has been described that as the value corresponding to the motion information is larger, more motions are included in the image.

After acquiring the motion information, the controller 170 according to an embodiment of the present disclosure may acquire the de-contour gain corresponding to the motion information (S540).

In this case, the de-contour gain may indicate the de-contour strength when the de-contour for removing the contour noise is performed. In the present disclosure, it has been described that as the de-contour gain is larger, the de-contour strength is higher.

Specifically, the controller 170 may remove the contour noise based on the de-contour gain table to which the de-contour gain values corresponding to the motion information are mapped.

In this case, the de-contour gain table may refer to a table or graph including at least one or more coordinates to which the de-contour gain values corresponding to motion information are mapped.

The de-contour gain table will be described in detail with reference to FIG. 8.

Figure 8:
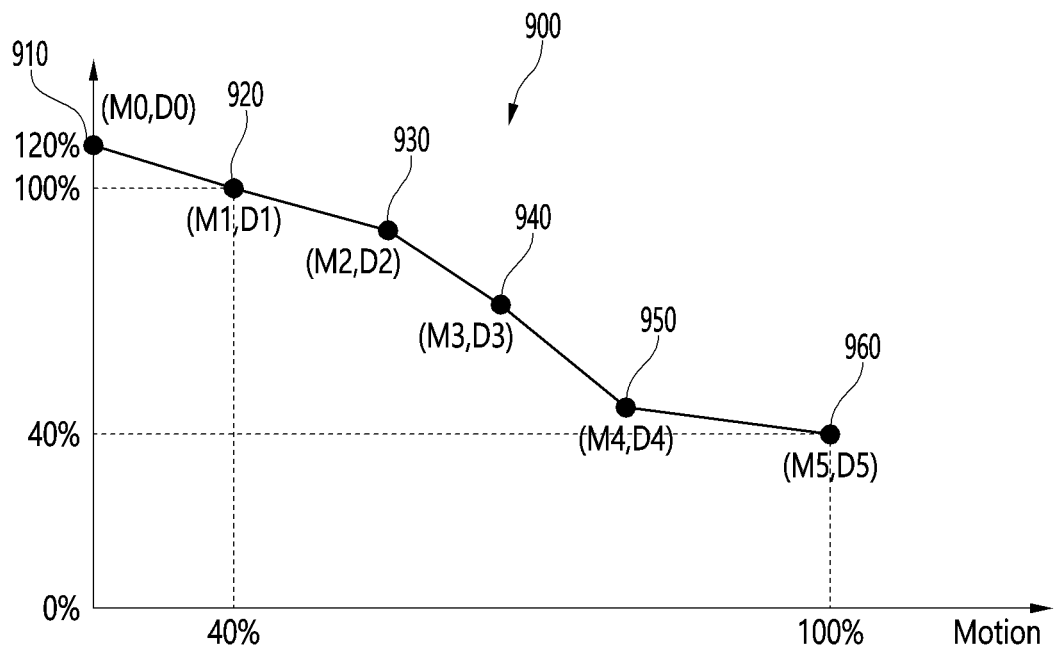
FIG. 8 illustrates an example of a de-contour gain table according to an embodiment of the present disclosure.

FIG. 8 illustrates a de-contour gain table 900 according to an embodiment of the present disclosure.

Referring to FIG. 8, the de-contour gain table 900 may include at least one or more pieces of coordinate data to which the de-contour gain (strength) corresponding to at least motion information is mapped.

For example, as shown in FIG. 8, the at least one or more pieces of coordinate data 910 to 960 may be mapped so that as the motion information has a larger value, the de-contour gain value is smaller.

Specifically, referring to the first coordinates 910, since no motion information is included in the image data, the maximum de-contour gain may be mapped to 120% when the motion information is 0%. This may indicate the maximum de-contour gain when the motion information has a minimum value.

In addition, referring to the second coordinates 920, motion information for the current image data may be M1, and a de-contour gain corresponding to M1 may be D1. When the motion information of the second coordinates 920 is 40%, the de-contour gain corresponding to the motion information may be 100%.

In addition, referring to the sixth coordinates 960, when the motion information is 100%, the de-contour gain corresponding to the motion information may be 40%. This may indicate the minimum de-contour gain when the motion information has a maximum value.

As in the above example, all of the remaining coordinates 920 to 950 may be mapped to the motion information and the de-contour gain corresponding to the motion information.

It can be confirmed that the plurality of coordinates according to an embodiment of the present disclosure are mapped so that the de-contour gain value is smaller as the motion information has a larger value, and the de-contour gain table may be generated with a set of the plurality of coordinates.

On the other hand, the coordinates are only examples and are not limited to the examples. In this example, the motion information and the de-contour gain are expressed as '%' relative to the maximum strength. However, this should also be understood as an example and may be expressed in various ways.

According to an embodiment of the present disclosure, the controller 170 may generate a de-contour gain curve based on the plurality of coordinate data.

Specifically, the de-contour gain curve may refer to a linear curve including a plurality of coordinates 910 to 960 and generated by connecting values between the plurality of coordinates 910 to 960.

More specifically, the de-contour gain table may include a plurality of mapping coordinates. First coordinates among the plurality of mapping coordinates may have a first de-contour gain value corresponding to a first motion information value. Second coordinates among the plurality of mapping coordinates may have a second de-contour gain value corresponding to a second motion information value. When the first motion information value is greater than the second motion information value, the first de-contour gain value may be smaller than the second de-contour gain value.

The controller 170 according to an embodiment of the present disclosure may connect the first coordinates to the second coordinates to generate a table including a plurality of coordinates to which de-contour gain values corresponding to arbitrary motion information between the motion information value of the first coordinates and the motion information value of the second coordinates are mapped.

The controller 170 may finally generate a de-contour gain curve by repeatedly performing the above method between adjacent coordinates.

The acquired de-contour gain table may be stored in a memory.

According to an embodiment of the present disclosure, the controller 170 may acquire the de-contour gain corresponding to all motion information by using the de-contour gain curve.

FIG. 5 is described again.

The controller 170 according to an embodiment of the present disclosure may acquire the de-contour gain corresponding to the motion information of the image data from the de-contour table, and may perform contour noise removal on the image data based on the de-contour gain.

Specifically, the controller 170 may detect at least one of the detail region, the skin region, or the high luminance generation region from the image data, may generate blur data by blurring regions other than the detected region from the image data, and may generate final image data by performing de-contour on image data generated by synthesizing the blur data and the image data.

The controller 170 may output the final image data through the display 180.

According to an embodiment of the present disclosure, the detail of the image may be maximally preserved by changing the de-contour strength corresponding to the motion information according to the motion information.

For example, if the amount of motion included in the image data is large, the detail may be maintained by reducing de-contour strength. In the case of still images, the amount of motion is small. Therefore, by setting the de-contour to be strong, the contour of the image may be corrected to be seen less.

Figure 9:
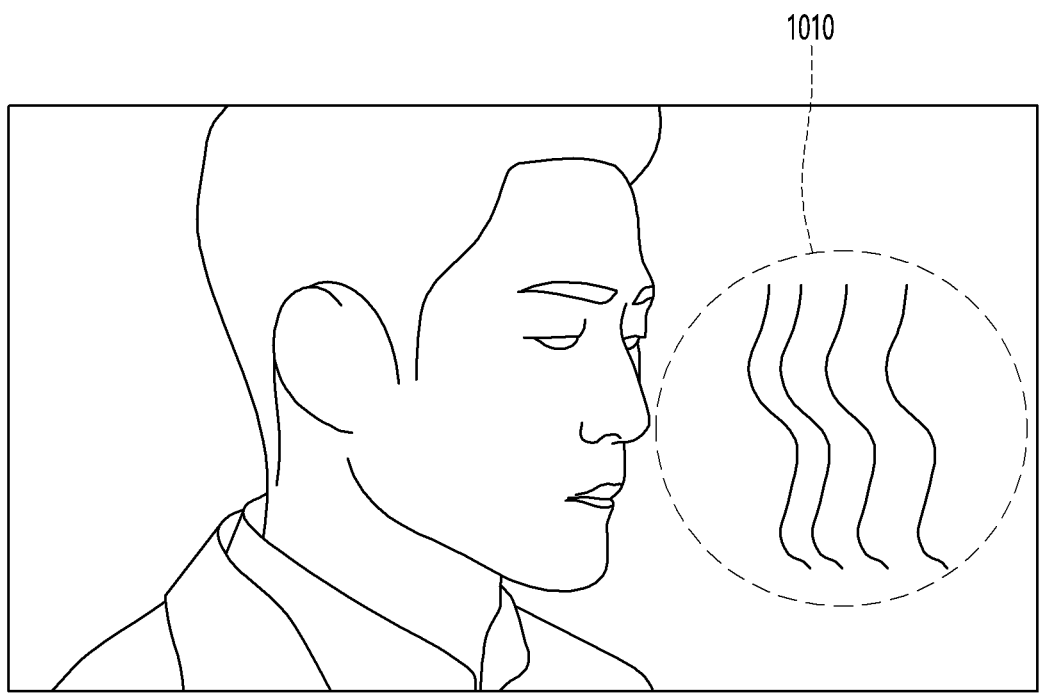
FIG. 9 illustrates image data according to an embodiment of the present disclosure.
Figure 10:
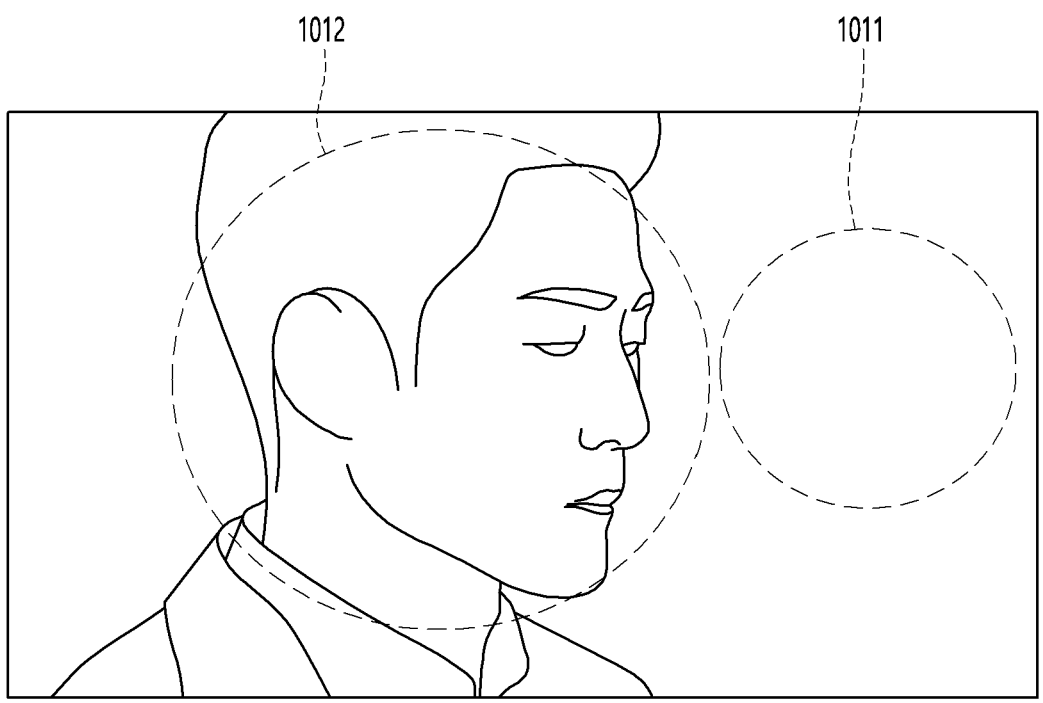
FIG. 10 illustrates an example of a de-contour result image of image data according to an embodiment of the present disclosure.

FIGS. 9 and 10 illustrate image data acquired by removing contour noise according to an embodiment of the present disclosure.

Referring to FIG. 9, at least one contour noise 1010 may be generated in image data. The controller 170 may control the contour noise through the algorithm described above.

Referring to FIG. 10, image data from which contour noise is removed may be observed.

In the case of a region 1011 in which contour noise exists, it can be seen that the contour noise is removed. In a detail region 1012 including a human skin, it can be seen that the detail is maintained without collapsing.

According to an embodiment of the present disclosure, the controller may output, on the display, a screen showing that dynamic contour noise removal is performed based on the motion information.

Specifically, the controller may guide a user that the dynamic contour noise removal is performed on a menu screen displaying display settings and the like.

By analyzing the motion information of the image together with the detail information of the image and dynamically applying the de-contour gain, the side effects such as image breaking or halo effect around objects occurring in images with fast motion may be eliminated, and image details may be maximally preserved.

The present disclosure may be embodied as computer-readable code on a program recording medium. The computer-readable recording medium may be any recording medium that stores computer-readable data. Examples of the computer-readable medium may include hard disk drive (HDD), solid state disk (SSD), silicon disk drive (SDD), read-only memory (ROM), random access memory (RAM), CD-ROM, magnetic tape, floppy disc, and optical data storage device. In addition, the computer may include the controller 170 of the display device 100.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

What is claimed is:

1. A display device comprising:
a display configured to output image data; and
a controller configured to:
extract a contour noise removal region from the image data;
acquire motion information of the image data; and
remove contour noise based on a de-contour gain value corresponding to the motion information,
wherein the controller is further configured to remove the contour noise based on a de-contour gain table to which the de-contour gain value corresponding to the motion information is mapped,
wherein the de-contour gain table includes a plurality of mapping coordinates,
wherein first coordinates among the plurality of mapping coordinates have a first de-contour gain value corresponding to a first motion information value,
wherein second coordinates among the plurality of mapping coordinates have a second de-contour gain value corresponding to a second motion information value, and
wherein when the first motion information value is greater than the second motion information value, the first de-contour gain value is smaller than the second de-contour gain value.

2. The display device of claim 1, wherein the de-contour gain table includes one or more coordinates mapped so that, as a value of the motion information is larger, the corresponding de-contour gain value is smaller.

3. The display device of claim 1, wherein the de-contour gain table includes a table including a plurality of coordinates having the de-contour gain value corresponding to the motion information by connecting the first coordinates to the second coordinates.

4. The display device of claim 1, wherein the controller is further configured to:
detect at least one of a detail region, a skin region, or a high luminance generation region from the image data;
generate blur data by blurring regions other than the detected at least one region from the image data;
synthesize the blur data and the image data; and
perform contour noise removal based on the de-contour gain value.

5. The display device of claim 1, wherein the controller is further configured to output, at the display, a screen showing that dynamic contour noise removal is performed based on the motion information.

6. An operating method of a display device, the operating method comprising:
outputting image data at a display;
extracting a contour noise removal region from the image data;
acquiring motion information of the image data; and
removing contour noise based on a de-contour gain value corresponding to the motion information,
wherein extracting the contour noise removal region from the image data comprises:
detecting at least one of a detail region, a skin region, or a high luminance generation region from the image data;
generating blur data by blurring regions other than the detected at least one region from the image data; and
synthesizing the blur data and the image data.

7. The operating method of claim 6, wherein removing the contour noise based on the de-contour gain value comprises removing the contour noise based on a de-contour gain table to which the de-contour gain value corresponding to the motion information is mapped.

8. The operating method of claim 7, wherein the de-contour gain table includes one or more coordinates mapped so that, as a value of the motion information is larger, the corresponding de-contour gain value is smaller.

9. The operating method of claim 7, wherein the de-contour gain table includes a plurality of mapping coordinates,
wherein first coordinates among the plurality of mapping coordinates have a first de-contour gain value corresponding to a first motion information value,
wherein second coordinates among the plurality of mapping coordinates have a second de-contour gain value corresponding to a second motion information value, and
wherein when the first motion information value is greater than the second motion information value, the first de-contour gain value is smaller than the second de-contour gain value.

10. The operating method of claim 9, wherein the de-contour gain table includes a table including a plurality of coordinates having the de-contour gain value corresponding to the motion information by connecting the first coordinates to the second coordinates.

11. The operating method of claim 6, further comprising outputting, at the display, a screen showing that dynamic contour noise removal is performed based on the motion information.

12. A display device comprising:
a display configured to output image data; and
a controller configured to:
extract a contour noise removal region from the image data;
acquire motion information of the image data;
remove contour noise based on a de-contour gain value corresponding to the motion information;
detect at least one of a detail region, a skin region, or a high luminance generation region from the image data;
generate blur data by blurring regions other than the detected at least one region from the image data;
synthesize the blur data and the image data; and
perform contour noise removal based on the de-contour gain value.

* * * * *